United States Patent
Miyazaki et al.

(10) Patent No.: US 7,680,136 B2
(45) Date of Patent: Mar. 16, 2010

(54) METHOD AND APPARATUS FOR ALLOCATING LABEL TO PATH IN RING NETWORK

(75) Inventors: Keiji Miyazaki, Kawasaki (JP); Yasuki Fujii, Kawasaki (JP); Shinya Kano, Kawasaki (JP); Akira Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 689 days.

(21) Appl. No.: 11/211,916

(22) Filed: Aug. 25, 2005

(65) Prior Publication Data

US 2006/0209860 A1   Sep. 21, 2006

(30) Foreign Application Priority Data

Mar. 18, 2005   (JP) .............................. 2005-079442

(51) Int. Cl.
*H04L 12/28* (2006.01)
*H04L 12/56* (2006.01)
*H04L 1/00* (2006.01)
*H04L 12/26* (2006.01)

(52) U.S. Cl. ...................... 370/406; 370/223; 370/405; 370/907

(58) Field of Classification Search ......... 370/404–406, 370/907, 222–223

See application file for complete search history.

(56) References Cited

U.S. PATENT DOCUMENTS 6,532,088 B1 *   3/2003   Dantu et al. .................. 398/43

FOREIGN PATENT DOCUMENTS

| JP | 2003-224586 | 8/2003 |
| JP | 2004-193644 | 7/2004 |
| JP | 2004-214891 | 7/2004 |

OTHER PUBLICATIONS

D. Awduche, et al. RSVP-TE: Extensions to RSVP for LSP Tunnels. Network Working Group. Dec. 2001.
Notice of Rejection mailed Oct. 27, 2009, from the corresponding Japanese Application.

* cited by examiner

*Primary Examiner*—Ronald Abelson
(74) *Attorney, Agent, or Firm*—Katten Muchin Rosenman LLP

(57) ABSTRACT

A transmission device, which carries out a route control of a frame based on a label included in the frame in a ring network, includes: a generating unit that generates a message for collecting information on first/second labels allocatable to working/standby routes; a transmitting unit that transmits the message in the ring network; a receiving unit that receives the message after being circulated in the ring network; and a selecting unit that selects one of the first/second labels for the working/standby route based on the information included in the message.

4 Claims, 13 Drawing Sheets

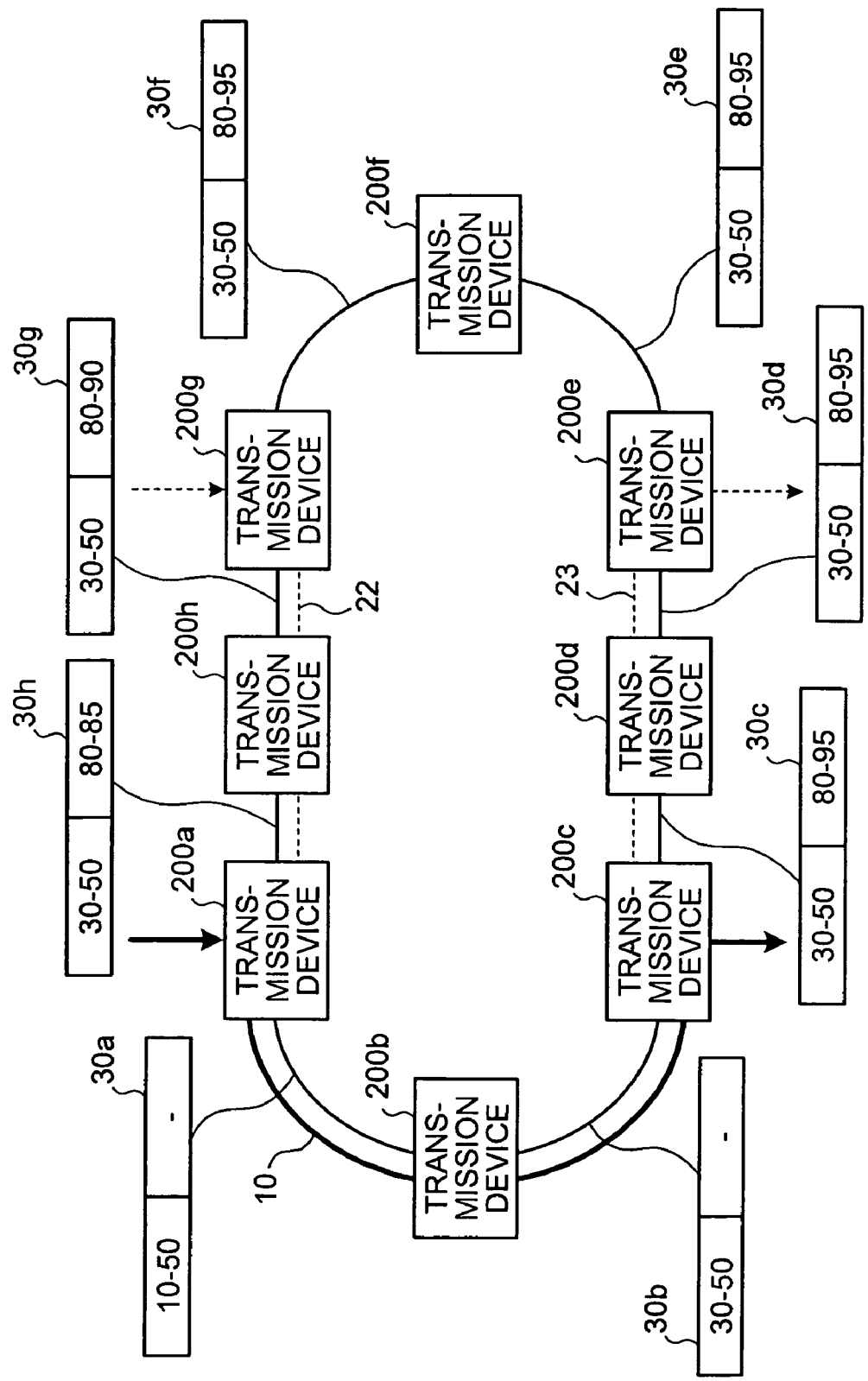

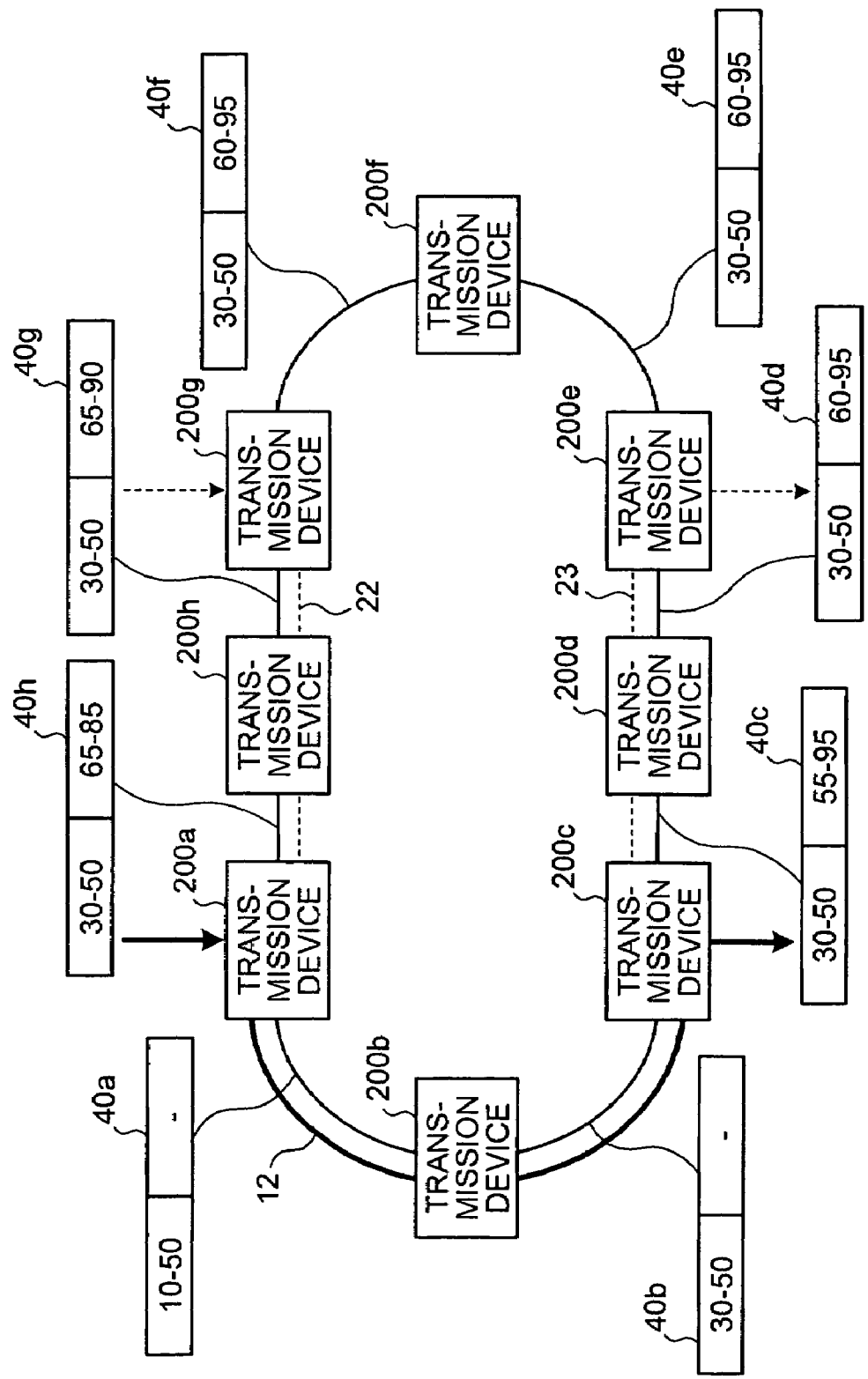

METHOD AND APPARATUS FOR ALLOCATING LABEL TO PATH IN RING NETWORK

BACKGROUND OF THE INVENTION

1. Field of the Invention

The present invention relates to a technology for allocating an appropriate label to a working route and a standby route in a ring network with a function of ring protection.

2. Description of the Related Art

Conventionally, in an Internet Protocol (IP) network, a transfer destination of an IP packet is determined based on a result of a calculation between an IP address and a netmask. However, the processing load on a router increases along the increase in the transmission speed in the network and along the increase in the quantity of IP packets processed by the router per unit time.

Thus, a new routing system called a Multi-Protocol Label Switching (MPLS) is recently widely used. According to the MPLS, address information called a label is attached to an IP packet, and a transfer destination of the IP packet is determined based on the label. Therefore, a routing can be achieved without carrying out the calculation, thereby avoiding the increase in the processing load on the router due to the increase in the transmission speed in the network.

When the MPLS is used, a path needs to be established between routers that carry out communications, and a label needs to be allocated to the path. When the network has a small scale, an administrator can establish a path and allocate a label. However, when the network has a large scale, load on the administrator becomes very heavy. Thus, a signaling technique such as a Resource Reservation Protocol-Traffic Extension (RSVP-TE), which makes each router autonomously establish a path and allocate a label, is drawing attention. The RSVP-TE is described in D. Awduche, L. Berger, D. Gan, T. Li, V. Srinivasan, G. Swallow "RSVP-TE: Extensions to RSVP for LSP Tunnels", December 2001, URL: http://www.ietf.org/rfc/rfc3209.txt.

The MPLS that makes a router efficiently carry out a routing can also be used in a network other than the IP network. A Generalized Multi Protocol Label Switching (GMPLS), which is a generalized MPLS, can be used in a network using optical fibers such a synchronous optical network (SONET) and a wavelength division multiplexing (WDM). However, the RSVP-TE and other conventional signaling techniques are based on a mesh structure like that of the IP network. Accordingly, these signaling techniques cannot support a protection function of a ring network such as the SONET.

For example, the SONET has a protection function called a Bidirectional Switched Ring (BLSR), which enabling a communication service to be maintained even when a failure occurs in any part of the ring. The function also becomes valid in the GMPLS when a specific constraint concerning a label allocation is satisfied. However, the RSVP-TE and other conventional signaling techniques cannot satisfy the constraint. Therefore, a path established based on these signaling techniques cannot be protected by the protection function, and the path becomes vulnerable to failure.

SUMMARY OF THE INVENTION

It is an object of the present invention to at least solve the problems in the conventional technology.

A transmission device according to an aspect of the present invention carries out a route control of a frame based on a label included in the frame in a ring network including at least one other transmission device. The transmission device includes: a message generating unit that generates a message for collecting information on a plurality of first labels allocatable to a working route in the ring network and a plurality of second labels allocatable to a standby route in the ring network; a message transmitting unit that transmits the message in the ring network; a message receiving unit that receives the message after being circulated in the ring network; and a label selecting unit that selects one of the first labels for the working route and one of the second labels for the standby route based on the information included in the message.

A method according to another aspect of the present invention is a method of selecting, in a ring network including a plurality of transmission devices, a first label allocatable to a working route in the ring network and a second label allocatable to a standby route in the ring network using a message including a first list of a plurality of first labels and a second list of a plurality of second labels. The method includes: a first transmission device generating a message for collecting information on a plurality of first labels allocatable to the working route and a plurality of second labels allocatable to the standby route; the first transmission device transmitting the message for circulating the message in the ring network; a second transmission device receiving the message transmitted; the second transmission device setting, in the second list, a second label that enables ring protection of the ring network and is calculated based on the first labels of the first list when the second transmission device is connected to both of the working route and the standby route; the second transmission device updating the message by excluding a first label allocatable to the second transmission device from the first list when the second transmission device is positioned on the working route, and by excluding a second label allocatable to the second transmission device from the second list when the second transmission device is positioned on the standby route; the first transmission device receiving the message after being circulated in the ring network; and the first transmission device selecting one of the first labels for the working route and one of the second labels for the standby route based on the information included in the message.

The other objects, features, and advantages of the present invention are specifically set forth in or will become apparent from the following detailed description of the invention when read in conjunction with the accompanying drawings.

BRIEF DESCRIPTION OF THE DRAWINGS

FIGS. 2A and 2B are diagrams for explaining a principle of the embodiment;

DETAILED DESCRIPTION OF THE PREFERRED EMBODIMENTS

Exemplary embodiments of the present invention will be explained in detail below with reference to the accompanying drawings.

Figure 1:
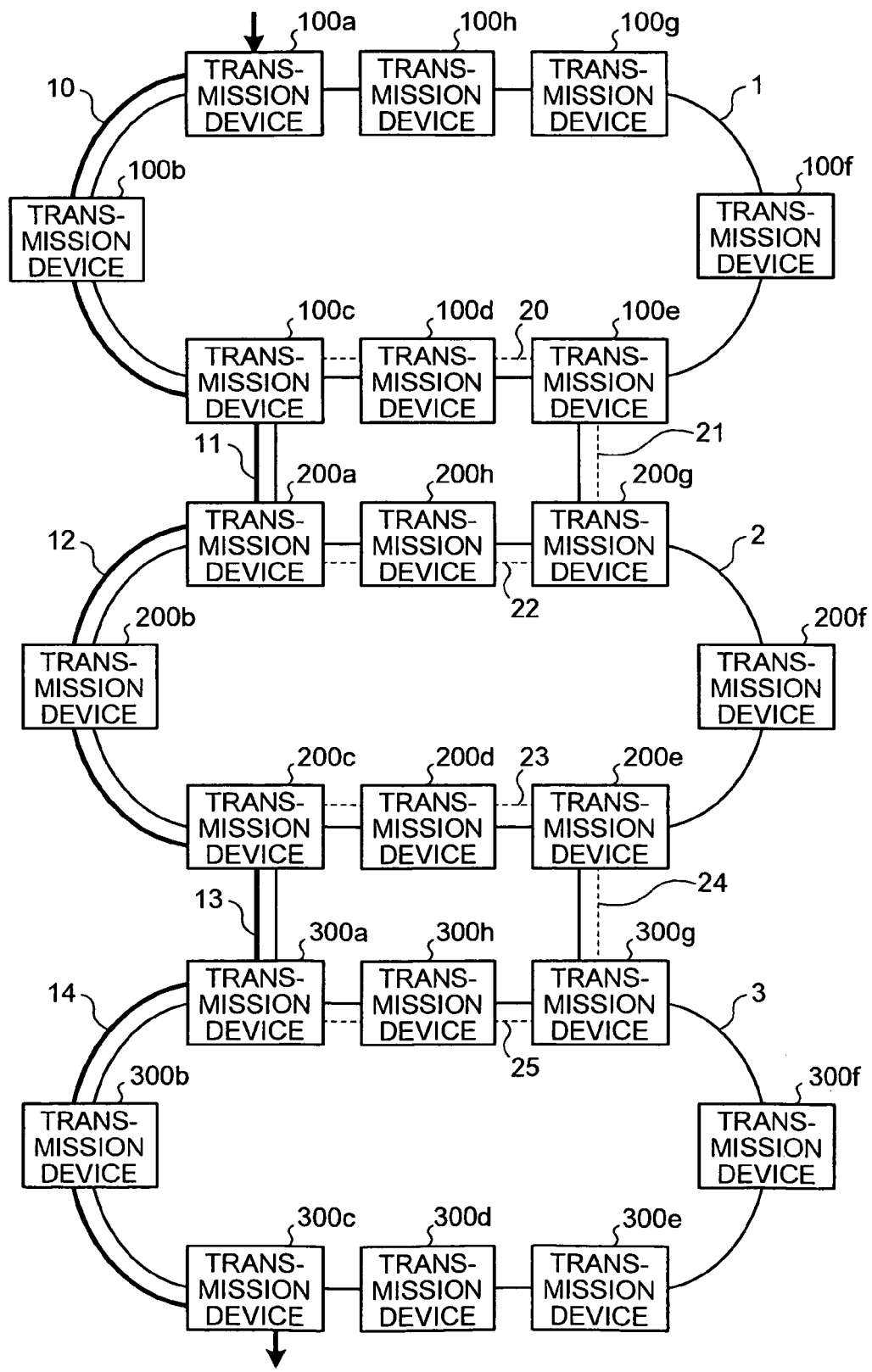
FIG. 1 is a diagram of one example of a network including a transmission device according to an embodiment of the present invention.

FIG. 1 is a diagram of one example of a network including a transmission device according to an embodiment of the present invention. The network shown in FIG. 1 is a multi-ring network of a SONET including three rings 1 to 3 and using the Bidirectional Switched Ring (BLSR) as a ring protection protocol.

The ring 1 includes transmission devices 100a to 100h connected by redundant optical fibers. Similarly, the ring 2 includes transmission devices 200a to 200h connected by redundant optical fibers, and the ring 3 includes transmission devices 300a to 300h connected by redundant optical fibers.

A route that connects between the rings is also redundant. The rings 1 and 2 are connected to each other using two routes including a route between the transmission devices 100c and 200a, and a route between the transmission devices 100e and 200g. Even when a failure occurs in one route, the other route can be used to maintain a communication service. Similarly, the rings 2 and 3 are connected to each other using two routes including a route between the transmission devices 200c and 300a, and a route between the transmission devices 200e and 300g.

If a device connected to the transmission device 100a transmits data to a device connected to the transmission device 300c, since data is transmitted on the multi-ring SONET, the routing is carried out based on the GMPLS. The rings are connected to each other by a standby route in addition to a working route.

In the example shown in FIG. 1, the working route consists of a link 10 between the transmission devices 100a and 100c, a link 11 between the transmission devices 100c and 200a, a link 12 between the transmission devices 200a and 200c, a link 13 between the transmission devices 200c and 300a, and a link 14 between the transmission devices 300a and 300c. In the working route, the links 10, 12, and 14 are protected by the BLSR. However, the links 11 and 13, which are not a part of the rings, are not protected by the BLSR.

Therefore, a standby route is set for the links 11 and 13, respectively, thereby protecting these links from being affected by a failure. Specifically, the standby route for the link 11 consists of a link 20 between the transmission devices 100c and 100e, a link 21 between the transmission devices 100e and 200g, and a link 22 between the transmission devices 200g and 200a. The standby route for the link 13 consists of a link 23 between the transmission devices 200c and 200e, a link 24 between the transmission devices 200e and 300g, and a link 25 between the transmission devices 300g and 300a.

When a failure occurs in the link 11, the transmission device 100c switches the transmission route from the working route to the standby route, thereby maintaining the connection between the transmission devices 100c and 200a. Similarly, when a failure occurs in the link 13, the transmission device 200c switches the transmission route from the working route to the standby route, thereby maintaining the connection between the transmission devices 200c and 300a.

To achieve the switching of routes when a failure occurs, a label allocated to each path of the link needs to follow a predetermined constraint. Contents of the constraint are different depending on the specification of each transmission device. The contents of the constraints in the present embodiment are as follows:

(1) one of labels 1 to 50 is allocated to the path of the working route;
(2) one of labels 51 to 100 is allocated to the path of the standby route; and
(3) a label allocated to the path of the standby route is greater than a label allocated to the path of the working route by 50.

For example, a label 57 needs to be allocated to the link 20 on the path of the standby route when a label 7 is allocated to the link 10 on the path of the working route of the same ring. A label 74 needs to be allocated to the link 22 on the path of the standby route when a label 24 is allocated to the link 12 on the path of the working route of the same ring.

When the conventional signaling technique such as the RSVP-TE is used, each transmission device autonomously establishes a route and allocates a label, thereby substantially decreasing the load on the administrator. However, since the conventional signaling technique does not take into account the above constraints, the protection function at the ring connection part does not work effectively.

FIG. 2A is a diagram for explaining the principle of the present embodiment. FIG. 2A depicts a procedure of searching for an idle label after a path is established in the ring 2 shown in FIG. 1. After the procedure is completed, a label is be allocated to each path. A method of establishing a path and a method of allocating a label are not specified.

Idle labels that can be allocated to each transmission device on the ring 2 are shown in the following table. While continuous numerical values are used for the allocatable labels in the table for the sake of convenience, the allocatable labels do not need to have continuous values.

TABLE 1

| Link | Allocatable labels | |
| --- | --- | --- |
| | Working route | Standby route |
| Between transmission devices 200a-200b | 10-50 | 51-90 |
| Between transmission devices 200b-200c | 30-50 | 60-95 |
| Between transmission devices 200c-200d | 10-50 | 55-95 |
| Between transmission devices 200d-200e | 25-40 | 60-100 |
| Between transmission devices 200e-200f | 5-30 | 55-75 |
| Between transmission devices 200f-200g | 5-50 | 65-100 |
| Between transmission devices 200g-200h | 15-25 | 65-90 |
| Between transmission devices 200h-200a | 10-40 | 51-85 |

As shown in FIG. 2A, the transmission device 200a that becomes a path starting point issues a label searching message 30a, and circulates the message within the ring. The label searching message 30a includes a list of labels allocatable to the working route (hereinafter, "working label list"), and a list of labels allocatable to the standby route (hereinafter, "standby label list"). The transmission device 200a, which is the starting point of the working route, sets the labels of the working route not allocatable to the own device into the working label list. Specifically, the transmission device 200a sets labels 10-50 allocatable to the link between the own device and the adjacent transmission device 200b into the working label list in the label searching message 30a, and transmits the label searching message 30a to the transmission device 200b.

The transmission device 200b receives the label searching message 30a, confirms that the route between the own device and the adjacent transmission device 200c is the working route, and takes a logical product of the working label list in the label searching message 30a and labels 30-50 of the working route allocatable to the link between the own device and the adjacent transmission device 200c. The transmission device 200b sets a result of the logical product into the working label list, and transmits the result as a label searching message 30b to the transmission device 200c. Specifically, the transmission device 200b sets 30-50 to the working label list in the label searching message 30b, and transmits the label searching message 30b to the transmission device 200c. The working label list 30-50 indicates labels for the working route allocatable to the link between the transmission devices 200a and 200c.

Taking the logical product of the labels allocatable to the link between the own device and the adjacent transmission device and the label list in the label searching message is the same as excluding the label allocatable to the own device from the label list in the label searching message.

The transmission device 200c receives the label searching message 30b, confirms that the own device is a starting point of the standby route, converts the working label list 30-50 in the label searching message 30b into a standby label list 80-100, which becomes an initial value of the standby label list. The transmission device 200c takes a logical product of the labels 80-100 in the standby label list and labels 55-95 of the standby route allocatable to the link between the own device and the adjacent transmission device 200d, sets a result of the logical product into the standby label list, and transmits the result as a label searching message 30c to the transmission device 200d. Specifically, the transmission device 200c sets 80-95 into the standby label list in the label searching message 30c, and transmits the label searching message 30c to the transmission device 200d. The standby label list 80-95 reflects the constraint for the ring protection.

The transmission device 200d receives the label searching message 30c, confirms that a route between the own device and the adjacent transmission device 200e is the standby route, and takes a logical product of the labels 80-95 in the standby label list in the label searching message 30c and labels 60-100 of the standby route allocatable to the link between the own device and the adjacent transmission device 200e. The transmission device 200d sets a result of the logical product into the standby label list, and transmits the result as a label searching message 30d to the transmission device 200e. Specifically, the transmission device 200d sets 80-95 into the standby label list in the label searching message 30d, and transmits the label searching message 30d to the transmission device 200e. The standby label list 80-95 indicates labels for the standby route allocatable to the link between the transmission devices 200c and 200e.

The route between the transmission devices 200e and 200f is neither the working route nor the standby route. Therefore, the transmission devices 200e and 200f, which receive the label searching messages 30d and 30e, respectively, transfer the received messages as it is to the adjacent transmission devices 200f and 200g.

The transmission device 200g receives a label searching message 30f from the transmission device 200f, confirms that a route between the own device and the adjacent transmission device 200h is the standby route, and takes a logical product of the labels 80-90 in the standby label list in the label searching message 30f and labels 65-90 of the standby route allocatable to the link between the own device and the adjacent transmission device 200h. The transmission device 200g sets a result of the logical product into the standby label list, and transmits the result as a label searching message 30g to the transmission device 200h. Specifically, the transmission device 200g sets 80-90 into the standby label list in the label searching message 30g, and transmits the label searching message 30g to the transmission device 200h. The standby label list 80-90 indicates labels for the standby route allocatable to the link between the transmission devices 200c and 200e and between the transmission devices 200g and 200h.

The transmission device 200h receives the label searching message 30g from the transmission device 200g, confirms that a route between the own device and the adjacent transmission device 200a is the standby route, and takes a logical product of labels 80-90 in the standby label list in the label searching message 30g and labels 51-85 of the standby route allocatable to the link between the own device and the adjacent transmission device 200a. The transmission device 200h sets a result of the logical product into the standby label list, and transmits the result as a label searching message 30h to the transmission device 200a. Specifically, the transmission device 200h sets 80-85 into the standby label list in the label searching message 30h, and transmits the label searching message 30h to the transmission device 200a. The standby label list 80-85 indicates labels for the standby route allocatable to the link between the transmission devices 200c and 200e and between the transmission devices 200g and 200a.

The transmission device 200a receives the label searching message 30h, confirms that the label searching message 30h is the one issued by the own device, and selects a label to be set to each link based on the message. Specifically, the transmission device 200a selects a label for the links 22 and 23 from the standby label list in which the constraint for the ring protection is reflected, and sets a label of the working route corresponding to the selected label as the label of the link 12. For example, when 80 is selected for the label of the links 22 and 23, a value 30 is selected for the label of the link 12.

As explained above, a label searching message is circulated for one round from a transmission device at a starting point, thereby excluding labels that can be allocated to each of the transmission devices. Further, a transmission device at a switching part between the working route and the standby route reflects the constraint for the ring protection, thereby enabling an automatic allocation of label following the constraint for enabling ring protection.

In the example shown in FIG. 2A, the transmission device at a switching part between the working route and the standby route reflects the constraint for the ring protection. Alternatively, a transmission device at the starting point can consider the constraint for the ring protection at the time of finally selecting a label. In the example shown in FIG. 2B, the transmission device 200c at the switching part sets a standby label list without reflecting the constraint for the ring protection. Instead, the transmission device 200a compares the working label list with the standby label list in a label searching message 40h, and selects a label by taking into account the constraint. However, the following explanation of the present embodiment is based on the system shown in FIG. 2A.

Figure 3:
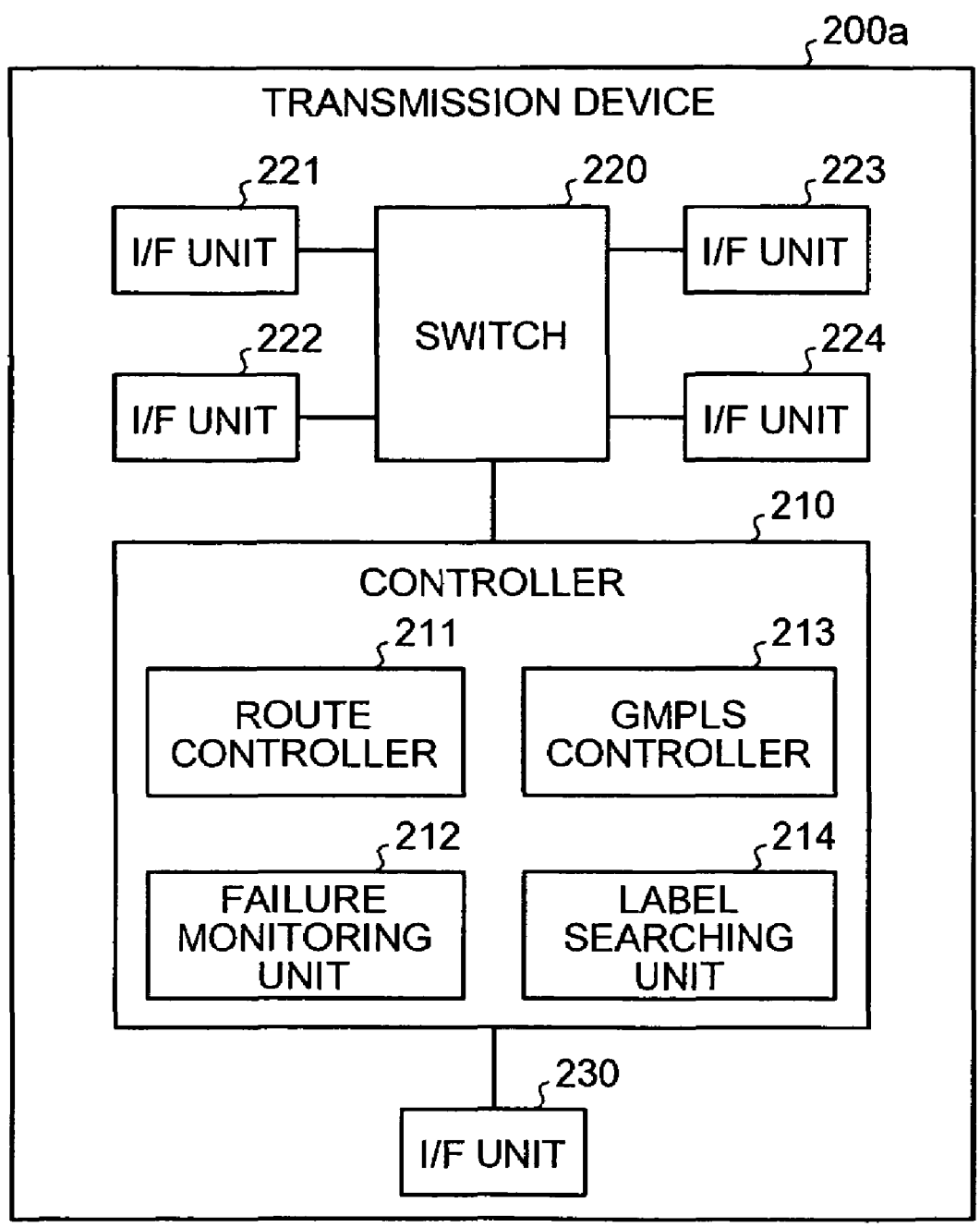
FIG. 3 is a block diagram of a transmission device according to the embodiment.

FIG. 3 is a block diagram of the transmission device 200a according to the present embodiment (the transmission devices 100a to 100h, 200a to 200h, and 300a to 300h shown in FIG. 1 have similar configurations). As shown in FIG. 3, the transmission device 200a includes a controller 210 and interface (I/F) units 221 to 224 connected to one another via a switch 220. Another I/F unit 230 is connected to the controller 210.

The controller 210 controls the transmission device 200a, and includes a route controller 211, a failure monitoring unit 212, a Generalized Multi Protocol Label Switching (GMPLS) controller 213, and a label searching unit 214. The route controller 211 controls a route of a communication path. The failure monitoring unit 212 monitors for an occurrence of a failure in the network to which the transmission device 200a belongs. Upon detecting a failure, the failure monitoring unit 212 notifies the fact to the route controller 211, and makes the route controller 211 change the route and the like. The GMPLS controller 213 transmits and receives a frame based on the GMPLS. The label searching unit 214 searches a label using a label searching message.

The I/F units 221 to 224 connect between optical fibers of two systems that form a ring network. The I/F units 221 to 224 are connected to one another via the switch 220. Upon detecting a failure in the network, the failure monitoring unit 212 dynamically switches the connection based on an instruction from the route controller 211. The I/F unit 230 connects the transmission device in the ring network with another transmission device in another network other than the ring network. For the transmission device 200a, the I/F unit 230 is used to connect the transmission device 200a with the transmission device 100c. For other transmission devices, the I/F unit 230 can be also used to connect the transmission device with another device in a local area network (LAN), for example.

Figure 4:
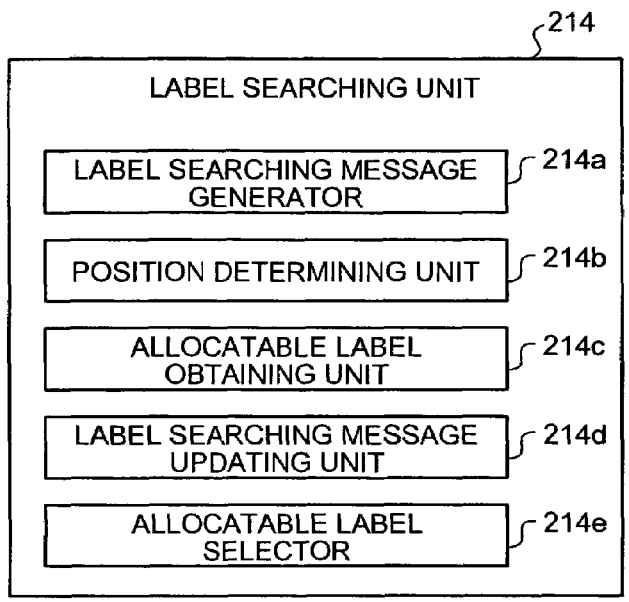
FIG. 4 is a block diagram of a label searching unit shown in FIG. 3.

FIG. 4 is a block diagram of the label searching unit 214 shown in FIG. 3. The label searching unit 214 includes a label searching message generator 214a, a position determining unit 214b, an allocatable label obtaining unit 214c, a label searching message updating unit 214d, and an allocatable label selector 214e.

When a GMPLS label needs to be set to a new path, the label searching message generator 214a of the transmission device at a starting point of the path generates a label searching message.

Figure 5:
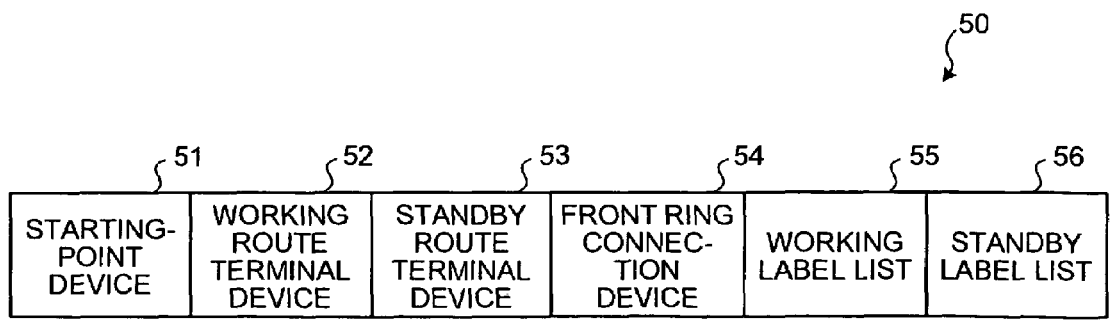
FIG. 5 is a diagram of one example of a label searching message.

FIG. 5 is a diagram of one example of a label searching message generated by the label searching message generator 214a. A label searching message 50 includes items concerning route information of a starting-point device 51, a working route terminal device 52, a standby route terminal device 53, and a front ring connection device 54, in addition to a working label list 55 and a standby label list 56. An identification code of a transmission device at a starting point of a path is set to the starting-point device 51. Any identification code can be used as long as it can uniquely identify the transmission device. An identification code of a transmission device at the terminal of the working route is set to the working route terminal device 52. An identification code of a transmission device at the terminal of the standby route is set to the standby route terminal device 53. An identification code of a transmission device at a connection part of the standby route continued from the front ring is set to the front ring connection device 54.

For example, when the transmission device 200a shown in FIG. 2A generates a label searching message, the identification code of the transmission device 200a is set to the starting-point device 51. The identification code of the transmission device 200c is set to the working route terminal device 52. The identification code of the transmission device 200e is set to the standby route terminal device 53. The identification code of the transmission device 200g is set to the front ring connection device 54. In some ring networks, transmission devices corresponding to the working route terminal device 52, the standby route terminal device 53, and the front ring connection device 54 are not present. In such cases, the corresponding items are blank.

When the transmission device receives a label searching message, the position determining unit 214b refers to the starting-point device 51 to the front ring connection device 54 in the message, and determines whether the own device is present at the starting point, the terminal, or in the middle of the working route or the standby route. The allocatable label obtaining unit 214c obtains information of idle labels allocatable to the link between the own device and the adjacent transmission device, from the GMPLS controller 213.

When it is determined that the own device is present at the starting point, the terminal, or in the middle of the working route or the standby route, the label searching message updating unit 214d instructs the allocatable label obtaining unit 214c to obtain information of allocatable idle labels, and reflects the obtained information in the label searching message. Specifically, when it is determined that the own device is present at the starting point of the working route, the label searching message updating unit 214d instructs the allocatable label obtaining unit 214c to obtain information of idle labels allocatable to the working route, and sets the obtained information into the working label list 55 in the label searching message. When it is determined that the own device is present at the terminal or in the middle of the working route, the label searching message updating unit 214d instructs the allocatable label obtaining unit 214c to obtain information of idle labels allocatable to the working route, takes a logical product, and substitutes the working label list 55 in the label searching message with the logical product.

When it is determined that the own device is present at the starting point of the standby route, the label searching message updating unit 214d instructs the allocatable label obtaining unit 214c to obtain information of idle labels allocatable to the standby route, and sets the obtained information into the standby label list 56 in the label searching message. When it is determined that the own device is present at the terminal or in the middle of the standby route, the label searching message updating unit 214d instructs the allocatable label obtaining unit 214c to obtain information of idle labels allocatable to the standby route, takes a logical product, and substitutes the standby label list 56 in the label searching message with the logical product.

When it is determined that the own device is present at the terminal of the working route, the label searching message updating unit 214d converts the value of the working label list 55 into the value of the label list for the standby route by taking into account the constraint for ring protection, and sets the obtained value into the standby label list 56. In the present embodiment, a value 50 is added to the value of the working label list 55, and the obtained value is set into the standby label list 56.

When the received label searching message is the one issued by the own device, the allocatable label selector 214e determines a selectable label based on the contents of the message, and notifies the label to the GMPLS controller 213. In the present embodiment, the allocatable label selector 214e selects a label for the standby route from the values of the standby label list 56, and subtracts 50 from the selected label to obtain a label for the working route. Thus, labels that can enable the function of ring protection can be automatically selected for the working route and the standby route, respectively.

Figure 6:
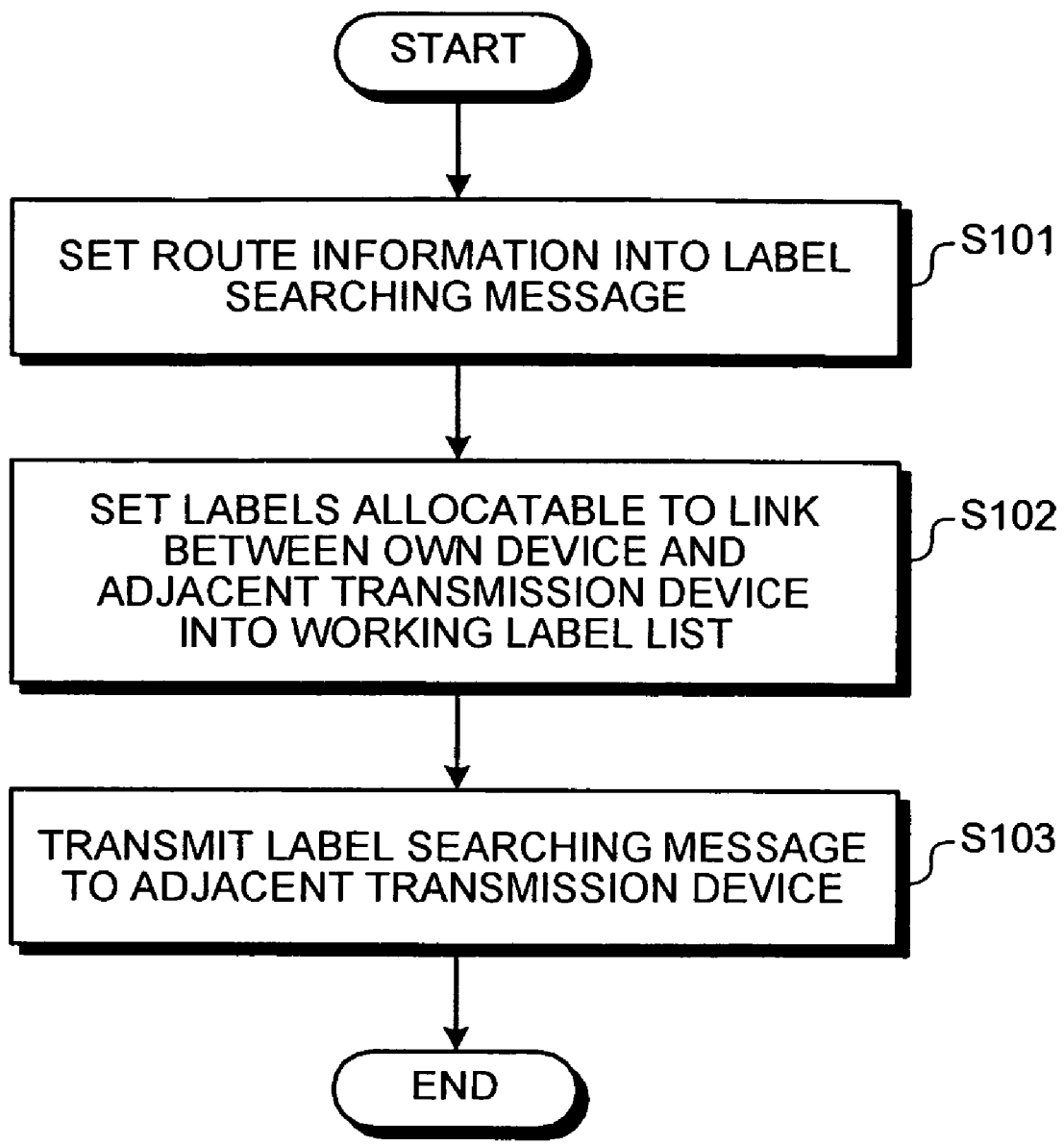
FIGS. 6 to 14 are flowcharts of a procedure carried out by the transmission device shown in FIG. 3.
Figure 7:
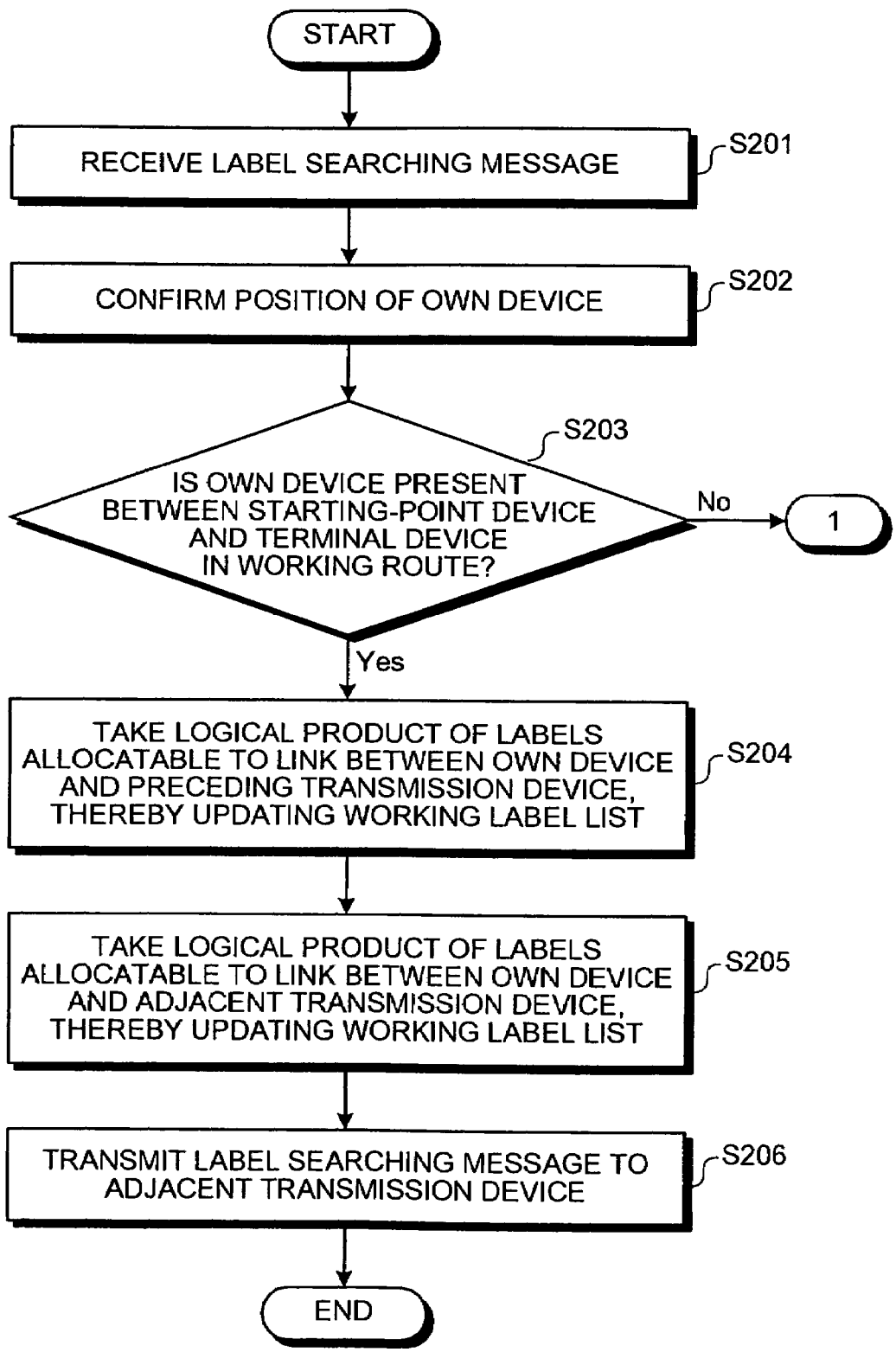

FIGS. 6 to 14 are flowcharts of a procedure carried out by the transmission device 200a shown in FIG. 3. FIG. 6 is a flowchart of a generation and a transmission of a label searching message performed by the transmission device at a path starting point shown in FIG. 3. The transmission device at the path starting point sets route information such as the starting-point device into the label searching message (step S101). The transmission device obtains labels allocatable to the link between the own device and the adjacent transmission device, sets the labels into the working label list (step S102), and transmits a generated label searching message to the adjacent transmission device (step S103).

FIGS. 7 to 14 are flowcharts of a procedure performed by each of the transmission devices upon receiving a label searching message. The transmission device receives a label searching message (step S201), and confirms a position of the own device (step S202). When it is found that the own device is present between the starting-point device and the terminal device of the working route (step S203: Yes), the transmission device obtain labels allocatable to the link between the own device and the preceding transmission device, and takes a logical product of the labels. The transmission device updates the working label list with the logical product (step S204), obtains labels allocatable to the link between the own device and the adjacent transmission device, and takes a logical product of the labels, thereby updating the working label list (step S205). The transmission device transmits the updated label searching message to the adjacent transmission device (step S206). The transmission device takes the logical product of labels allocatable to the link between the own device and the preceding transmission device, because there is a possibility that idle labels are used while the label searching message is transferred from the preceding transmission device to the own device.

Figure 8:
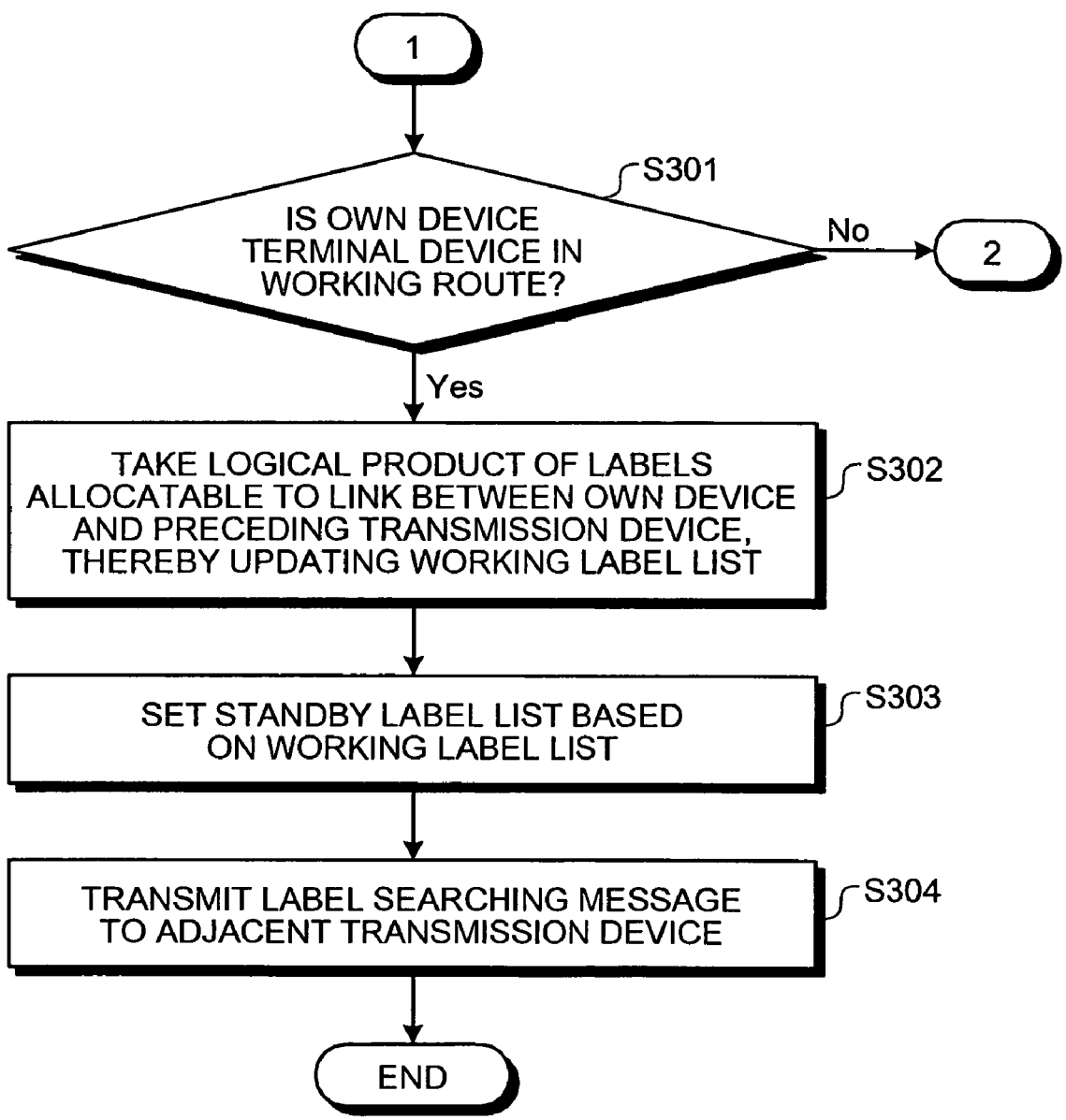

As shown in FIG. 8, when it is found that the own device is the terminal device of the working route (step S301: Yes), the transmission device obtains labels allocatable to the link between the preceding transmission device and the own device, and takes a logical product of the labels, thereby updating the working label list (step S302). The transmission device sets the standby label list based on the working label list (step S303), and transmits the updated label searching message to the adjacent transmission device (step S304).

Figure 9:
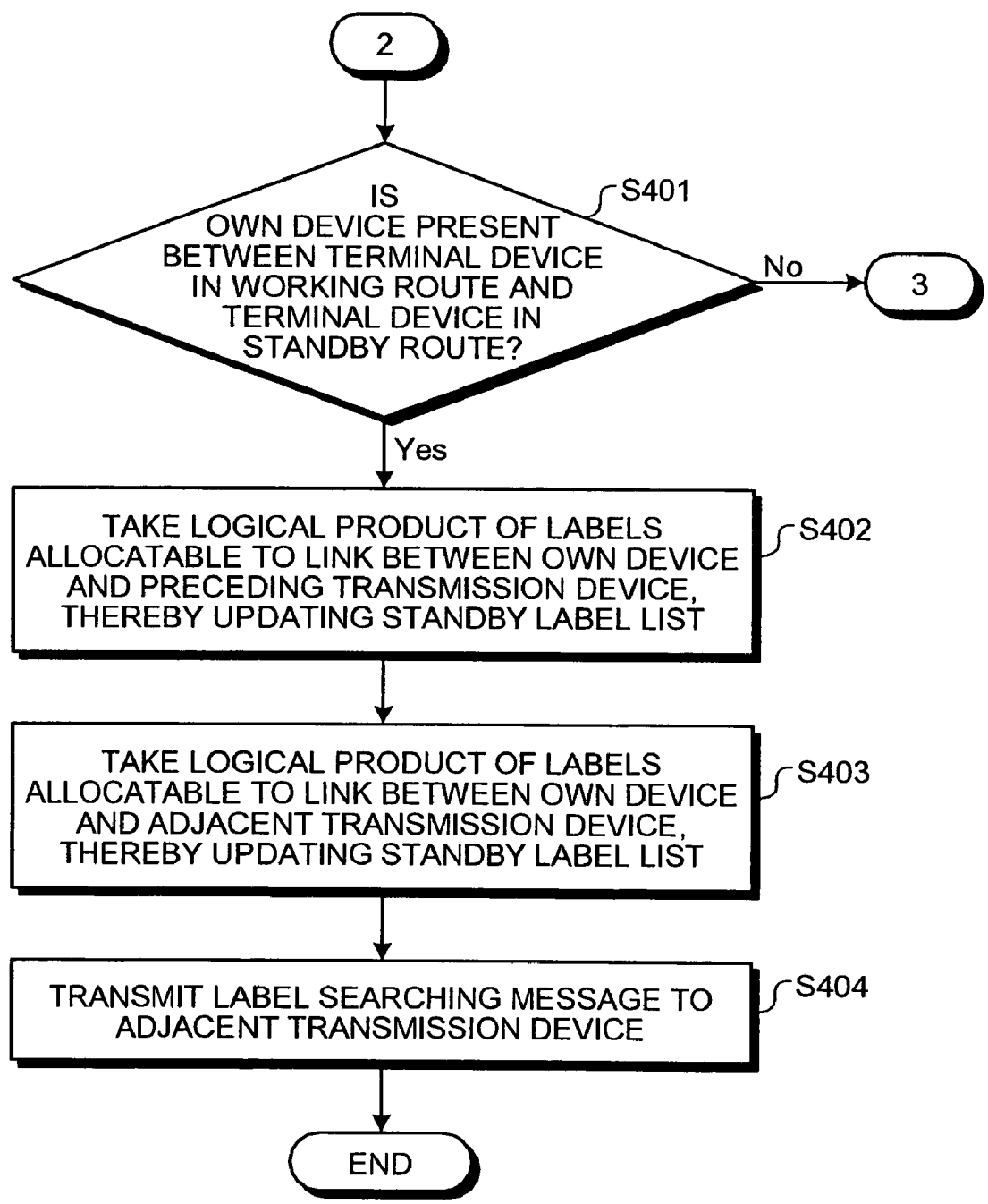

As shown in FIG. 9, when it is found that the own device is present between the terminal device of the working route and the terminal device of the standby route (step S401: Yes), the transmission device obtains labels allocatable to the link between the preceding transmission device and the own device, and takes a logical product of the labels, thereby updating the standby label list (step S402). The transmission device obtains labels allocatable to the link between the own device and the adjacent transmission device, and takes a logical product of the labels, thereby updating the standby label list (step S403). The transmission device transmits the updated label searching message to the adjacent transmission device (step S404).

Figure 10:
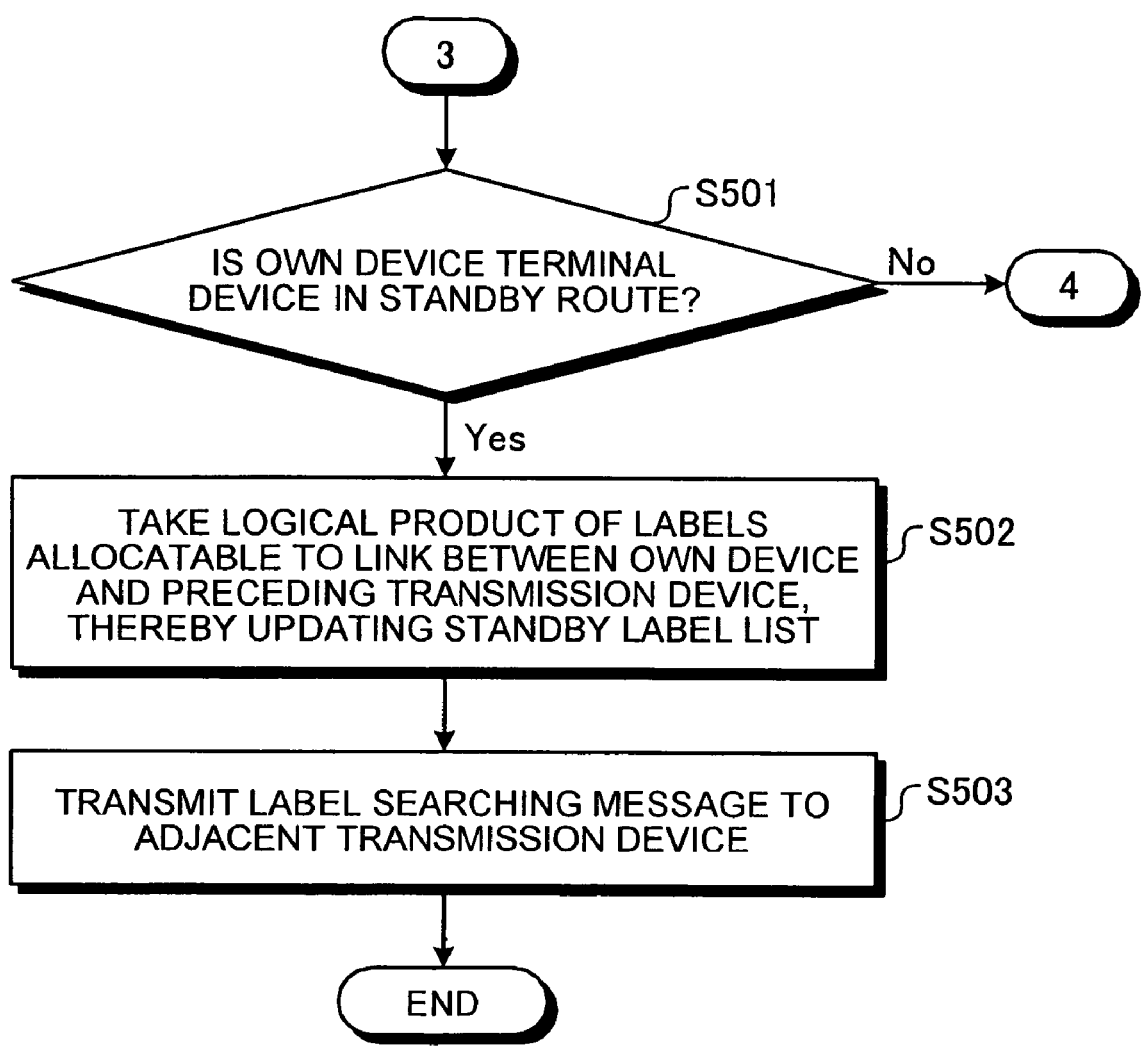

As shown in FIG. 10, when it is found that the own device is a terminal device of the standby route (step S501: Yes), the transmission device obtains labels allocatable to the link between the preceding transmission device and the own device, and takes a logical product of the labels, thereby updating the standby label list (step S502). The transmission device transmits the updated label searching message to the adjacent transmission device (step S503).

Figure 11:
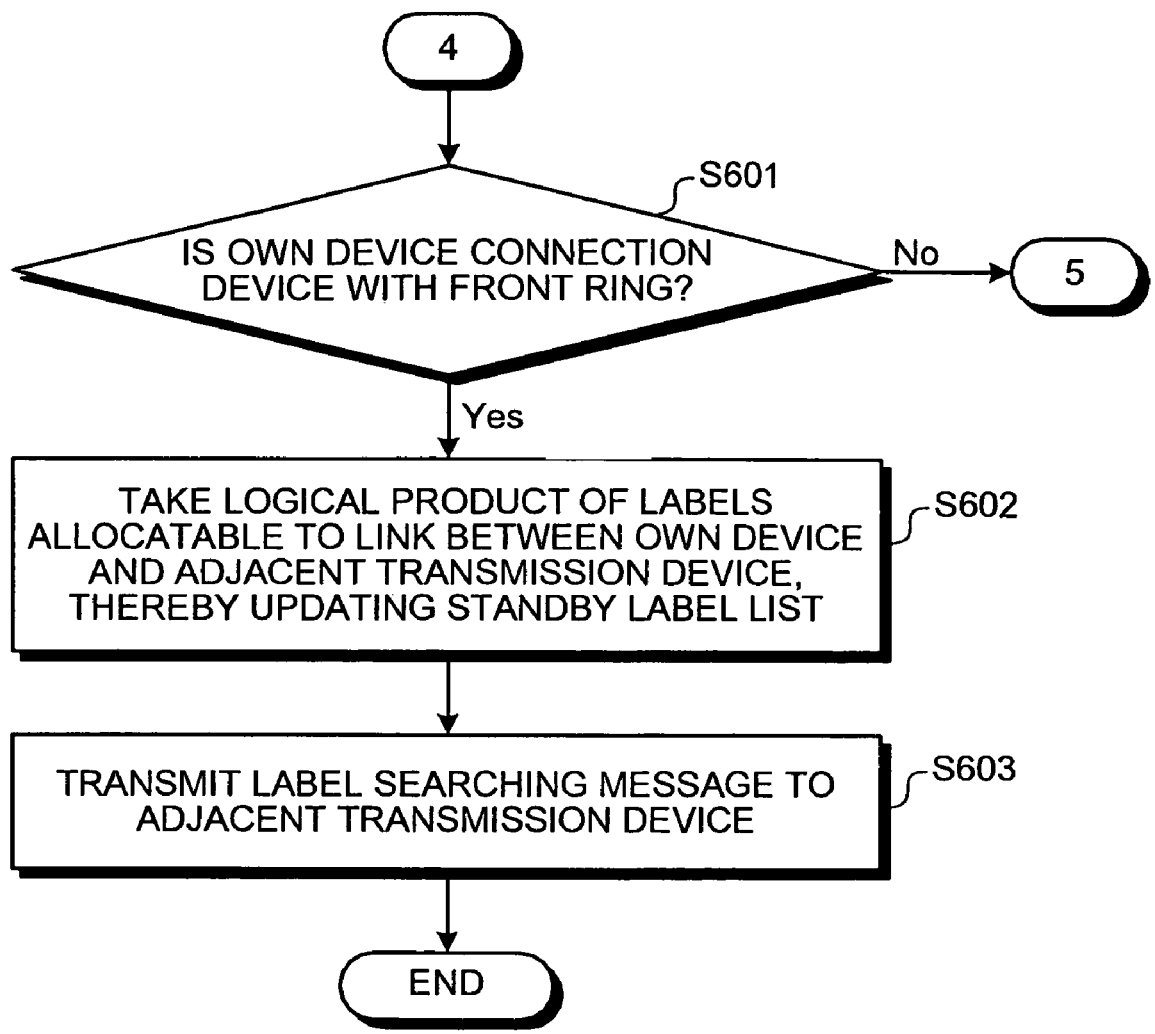
Figure 12:
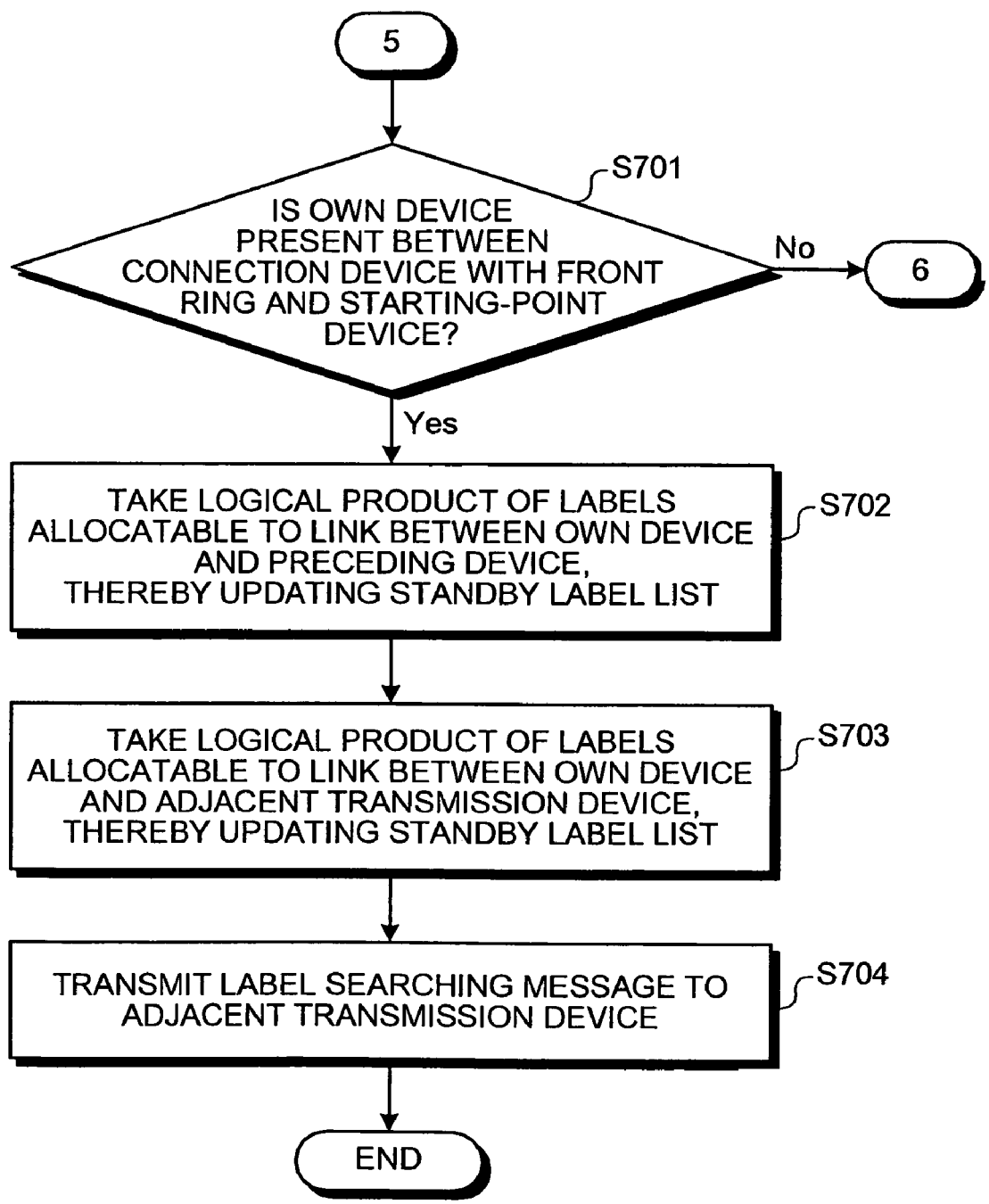

As shown in FIG. 11, when it is found that the own device is a connection device with the front ring (step S601: Yes), the transmission device obtains labels allocatable to the link between the own device and the adjacent transmission device, and takes a logical product of the labels, thereby updating the standby label list (step S602). The transmission device transmits the updated label searching message to the adjacent transmission device (step S603).

Figure 13:
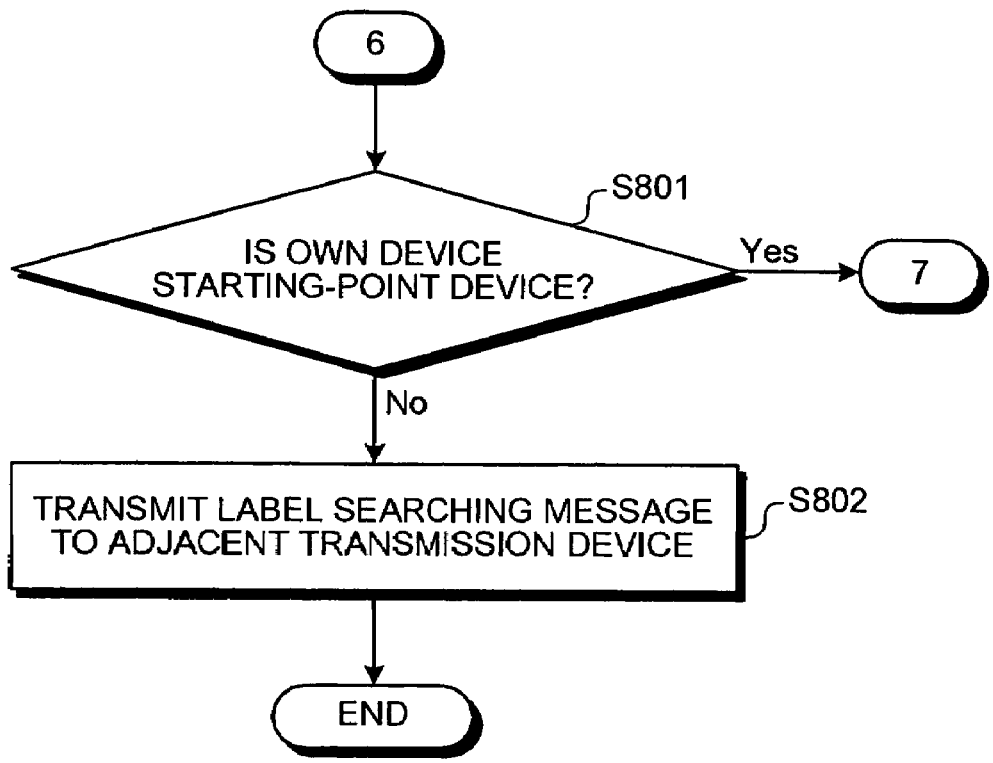
Figure 14:
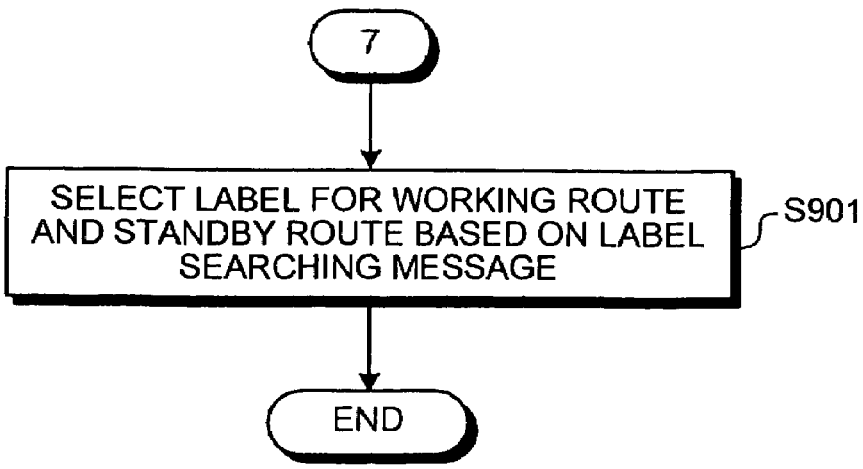

As shown in FIG. 13, when the own device does not correspond to any case explained above and is not a starting-point device (step S801: No), the transmission device transmits the label searching message as it is to the adjacent transmission device (step S802). When it is found that the own device is a starting-point device (step S801: Yes), the transmission device selects a label for the working route and the standby route based on the label searching message (step S901), as shown in FIG. 14.

As explained above, according to the present embodiment, in allocating a label to a path, a label searching message is circulated from the starting-point transmission device, thereby collecting information of idle labels allocatable to the working route and the standby route by taking a logical product of the labels. Further, the transmission device at a switching part between the working route and the standby route sets the initial value of the label list for the standby route by taking into account the constraints for the ring protection. Therefore, the transmission device can autonomously allocate a label enabling the ring protection function of the ring network.

According to the present embodiment, a mechanism of searching idle labels is provided separately from the conventional mechanism of establishing a path and allocating a label. Therefore, the new mechanism can be introduced without substantially changing the conventional mechanism of establishing a path and allocating a label.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A transmission device that carries out a route control of a frame based on a label included in the frame in a ring network including at least one other transmission device, the transmission device comprising:

a message generating unit that generates a message for collecting information on a plurality of first labels allocatable to a working route in the ring network and a plurality of second labels allocatable to a standby route in the ring network;

a message transmitting unit that transmits the message to the at least one other transmission device through the ring network;

a message receiving unit that receives the message that has been circulated through the ring network via the at least one other transmission device; and a label selecting unit that selects one of the first labels for the working route and one of the second labels for the standby route based on the information included in the message that has been circulated, wherein the message includes a first list of the first labels and a second list of the second labels, and the message receiving unit receives a message generated by the other transmission device, and the transmission device further includes a message updating unit that updates the message by excluding a first label allocatable to the transmission device from the first list when the transmission device is positioned on the working route, and by excluding a second label allocatable to the transmission device from the second list when the transmission device is positioned on the standby route.

2. The transmission device according to claim 1, wherein the message updating unit updates the message by setting, in the second list, a second label that enables ring protection of the ring network and is calculated based on the first labels of the first list when the transmission device is connected to both the working route and the standby route.

3. The transmission device according to claim 1, wherein the ring network is connected to at least one other network with the working route and the standby route.

4. A method of selecting, in a ring network including a plurality of transmission devices, a first label allocatable to a working route in the ring network and a second label allocatable to a standby route in the ring network using a message including a first list of a plurality of first labels and a second list of a plurality of second labels, the method comprising:
- a first transmission device generating a message for collecting information on a plurality of first labels allocatable to the working route and a plurality of second labels allocatable to the standby route;
- the first transmission device transmitting the message for circulating the message in the ring network;
- a second transmission device receiving the message transmitted;
- the second transmission device setting, in the second list, a second label that enables ring protection of the ring network and is calculated based on the first labels of the first list when the second transmission device is connected to both of the working route and the standby route; the second transmission device updating the message by excluding a first label allocatable to the second transmission device from the first list when the second transmission device is positioned on the working route, and by excluding a second label allocatable to the second transmission device from the second list when the second transmission device is positioned on the standby route;
- the first transmission device receiving the message after being circulated in the ring network; and
- the first transmission device selecting one of the first labels for the working route and one of the second labels for the standby route based on the information included in the message.

\* \* \* \* \*